(12) United States Patent
Zhu et al.

(10) Patent No.: US 9,774,380 B2
(45) Date of Patent: Sep. 26, 2017

(54) REPEATING METHOD OF WIRELESS REPEATING DEVICE, AND WIRELESS REPEATING DEVICE

(71) Applicant: Huawei Device Co., Ltd., Shenzhen, Guangdong (CN)

(72) Inventors: Chong Zhu, Wuhan (CN); Wei Du, Wuhan (CN)

(73) Assignee: Huawei Device Co., Ltd., Shenzhen (CN)

(*) Notice: Subject to any disclaimer, the term of this patent is extended or adjusted under 35 U.S.C. 154(b) by 0 days.

(21) Appl. No.: 13/714,266

(22) Filed: Dec. 13, 2012

(65) Prior Publication Data

US 2013/0182636 A1 Jul. 18, 2013

(30) Foreign Application Priority Data

Dec. 23, 2011 (CN) .......................... 2011 1 0437651

(51) Int. Cl.
*H04B 7/14* (2006.01)
*H04W 76/02* (2009.01)
(Continued)

(52) U.S. Cl.
CPC ............ *H04B 7/14* (2013.01); *H04W 76/022* (2013.01); *H04L 61/6022* (2013.01);
(Continued)

(58) Field of Classification Search
USPC ......................................................... 370/315
See application file for complete search history.

(56) References Cited

U.S. PATENT DOCUMENTS 7,230,935 B2 * 6/2007 Proctor et al. ................ 370/315
8,027,637 B1 9/2011 Bims
(Continued)

FOREIGN PATENT DOCUMENTS

CN 1659899 A 8/2005
CN 101133569 A 2/2008
(Continued)

OTHER PUBLICATIONS

Extended European Search Report in corresponding European Patent Application No. 12194979.6 (dated Mar. 13, 2013).
(Continued)

*Primary Examiner* — Hassan Kizou
*Assistant Examiner* — Ashil Farahmand
(74) *Attorney, Agent, or Firm* — Leydig, Voit & Mayer, Ltd.

(57) ABSTRACT

The present invention is applicable to the field of communications technologies, and provides a repeating method of a wireless repeating device and a wireless repeating device. The method includes the following steps: synchronizing network connection information of an upstream AP to a downstream WLAN AP interface of the wireless repeating device; obtaining, according to the downstream WLAN AP interface corresponding to the synchronized upstream AP, downstream wireless STA MAC address information, and establishing an upstream WLAN Client interface which is in a mapping relationship with an STA MAC address; and performing, according to the mapping relationship between the STA MAC address and the established upstream WLAN Client interface, management on data forwarded between the upstream AP and a downstream wireless STA.

14 Claims, 4 Drawing Sheets

(51) Int. Cl.
*H04W 84/12* (2009.01)
*H04W 88/04* (2009.01)
*H04W 84/04* (2009.01)
*H04L 29/06* (2006.01)
*H04L 29/12* (2006.01)

(52) U.S. Cl.
CPC ....... *H04L 63/0892* (2013.01); *H04W 84/047* (2013.01); *H04W 84/12* (2013.01); *H04W 88/04* (2013.01)

(56) References Cited

U.S. PATENT DOCUMENTS

| | | |
|---|---|---|
| 8,045,918 B2 | 10/2011 | Parikh et al. |
| 2003/0227893 A1 | 12/2003 | Bajic |
| 2005/0136834 A1 | 6/2005 | Bonta et al. |
| 2006/0046647 A1 | 3/2006 | Parikh et al. |
| 2006/0280138 A1* | 12/2006 | Nanda et al. ............... 370/315 |
| 2007/0121560 A1 | 5/2007 | Edge |
| 2008/0045153 A1 | 2/2008 | Surineni et al. |
| 2008/0120657 A1* | 5/2008 | Dong ............... H04N 7/106 725/82 |
| 2008/0165709 A1 | 7/2008 | Soliman |
| 2008/0261518 A1 | 10/2008 | Baier et al. |
| 2008/0297413 A1 | 12/2008 | Kokku et al. |
| 2009/0129386 A1 | 5/2009 | Rune |
| 2009/0290537 A1 | 11/2009 | Berglund et al. |
| 2012/0063359 A1 | 3/2012 | Hua et al. |
| 2012/0069787 A1* | 3/2012 | Tamura ............... H04L 12/2838 370/315 |

FOREIGN PATENT DOCUMENTS

| | | |
|---|---|---|
| CN | 101199166 A | 6/2008 |
| CN | 101471966 A | 7/2009 |
| CN | 102037713 A | 4/2011 |
| CN | 102204391 A | 9/2011 |
| CN | 101510853 B | 11/2011 |
| CN | 102238563 A | 11/2011 |
| CN | 102523628 A | 6/2012 |
| EP | 1480385 B1 | 6/2010 |
| RU | 2390791 C2 | 5/2010 |
| RU | 2431926 C2 | 10/2011 |
| RU | 2437258 C2 | 12/2011 |
| TW | 201021458 A | 6/2010 |
| WO | WO 03094450 A1 | 11/2003 |
| WO | WO 2006008559 A2 | 1/2006 |
| WO | WO 2009141385 A2 | 11/2009 |

OTHER PUBLICATIONS

"802.11—Part 11: Wireless LAN MAC and PHY Specifications," Jun. 12, 2007, pp. 351-700, IEEE, New York, New York.
"802.11—Part 11: Wireless LAN MAC and PHY Specifications," Jun. 12, 2007, pp. 701-1184, IEEE, New York, New York.
"802.11—Part 11: Wireless LAN MAC and PHY Specifications," Jun. 12, 2007, pp. 1-350, IEEE, New York, New York.
Russian Notice of Allowance in related patent application No. 2015130233 (dated Aug. 19, 2016).

* cited by examiner

REPEATING METHOD OF WIRELESS REPEATING DEVICE, AND WIRELESS REPEATING DEVICE

CROSS-REFERENCE TO RELATED APPLICATION

This application claims priority to Chinese Patent Application No. 201110437651.3, filed on Dec. 23, 2011, which is hereby incorporated by reference in its entirety.

FIELD OF THE INVENTION

The present invention relates to the field of communications technologies, and in particular, to a repeating method of a wireless repeating device, and a wireless repeating device.

BACKGROUND OF THE INVENTION

With the rapid development of wireless broadband Internet access services, wireless home gateway products develop rapidly. However, a physical layout of high-power wireless local area network (Wireless Local Area Network, WLAN) devices has certain limitations and a penetration capability of WIFI (wireless fidelity) signals is weak, which result in that there are certain blind areas in WIFI signal coverage, and therefore, development opportunities are brought to a WLAN signal repeating device WLAN Repeater. A WLAN Repeater includes a WLAN access point side (Access Point, AP) and a WLAN client side Client, where the WLAN AP side of the WLAN Repeater may receive access of a station (Station, STA) device, and the WLAN Client side may be used an STA to connect to another AP, which is as a good extension of WIFI signals, to effectively solve a coverage problem of the WIFI signals. Currently, for a WLAN Repeater product on the market, when data transmission is performed by a downstream interface (a WLAN AP interface) and an upstream interface (a WLAN Client interface), a wireless STA MAC address attached to a WLAN AP side is replaced with a MAC address of a WLAN Client side of the Repeater itself. Therefore, an existing Repeater product is not a WIFI signal repeater in a real sense.

However, in a scenario of WLAN coverage based on MAC address authentication/accounting, for example, in a scenario of enterprise-level WLAN (AP/AC) coverage based on AAA authentication and accounting or portal authentication, if the existing WLAN Repeater is adopted, an accounting party or an authentication party can perform accounting for an address of a WLAN Client of the WLAN Repeater only, and cannot perform accounting for an STA MAC address of each attached STA separately. Therefore, the existing WLAN Repeater cannot meet a requirement of unified authentication/accounting based on a MAC address.

SUMMARY OF THE INVENTION

An objective of embodiments of the present invention is to provide a repeating method of a wireless repeating device, so as to solve a problem that a WLAN Repeater in the prior art cannot meet a requirement of unified authentication/accounting based on a MAC address.

An embodiment of the present invention is implemented in this manner: a repeating method of a wireless repeating device, where the method includes the following steps:

synchronizing network connection information of an upstream AP to a downstream WLAN AP interface of the wireless repeating device after the wireless repeating device establishes a connection with the upstream AP;

obtaining, according to the downstream WLAN AP interface corresponding to the synchronized upstream AP, downstream wireless STA MAC address information, and establishing an upstream WLAN Client interface which is in a mapping relationship with an STA MAC address; and performing, according to the mapping relationship between the STA MAC address and the established upstream WLAN Client interface, management on data forwarded between the upstream AP and a downstream wireless STA.

An embodiment of the present invention further provides a wireless repeating device, where the wireless repeating device includes:

a synchronizing unit, configured to, synchronize network connection information of an upstream AP to a downstream WLAN AP interface of the wireless repeating device after the wireless repeating device establishes a connection with the upstream AP;

a mapping unit, configured to obtain, according to the downstream WLAN AP interface corresponding to the synchronized upstream AP, downstream wireless STA MAC address information, and establish an upstream WLAN Client interface which is in a mapping relationship with an STA MAC address; and a data management unit, configured to perform, according to the mapping relationship between the STA MAC address and the established upstream WLAN Client interface, management on data forwarded between the upstream AP and a downstream wireless STA.

DETAILED DESCRIPTION OF THE EMBODIMENTS

To make the objective, technical solutions, and advantages of the present invention clearer, the following further describes the present invention in detail with reference to the accompanying drawings and embodiments. It should be understandable that the specific embodiments to be described are only used to explain the present invention and are not intended to limit the present invention.

In the embodiments, by synchronizing network connection information of an upstream AP to a downstream WLAN AP interface of a wireless repeating device and establishing an upstream WLAN Client interface which is in a mapping relationship with an STA MAC address of a downstream STA, effective transparent transmission of an attached wireless STA MAC address is implemented.

An embodiment of the present invention provides a repeating method of a wireless repeating device, where the method includes the following steps: synchronizing network connection information of an upstream AP to a downstream WLAN AP interface of the wireless repeating device after the wireless repeating device establishes a connection with the upstream AP;

obtaining, according to the downstream WLAN AP interface corresponding to the synchronized upstream AP, downstream wireless STA MAC address information, and establishing an upstream WLAN Client interface which is in a mapping relationship with an STA MAC address; and performing, according to the mapping relationship between the STA MAC address and the established upstream WLAN Client interface, management on data forwarded between the upstream AP and a downstream wireless STA, where the data is management action data or service data.

An embodiment of the present invention further provides a wireless repeating device, where the wireless repeating device includes:

a synchronizing unit, configured to, synchronize network connection information of an upstream AP to a downstream WLAN AP interface of the wireless repeating device after the wireless repeating device establishes a connection with the upstream AP;

a mapping unit, configured to obtain, according to the downstream WLAN AP interface corresponding to the synchronized upstream AP, downstream wireless STA MAC address information, and establish an upstream WLAN Client interface which is in a mapping relationship with an STA MAC address; and a data management unit, configured to perform, according to the mapping relationship between the STA MAC address and the established upstream WLAN Client interface, management on data forwarded between the upstream AP and a downstream wireless STA, where the data is management action data or service data.

The implementation of the present invention is described below in detail with reference to specific embodiments.

Embodiment 1

Figure 1:
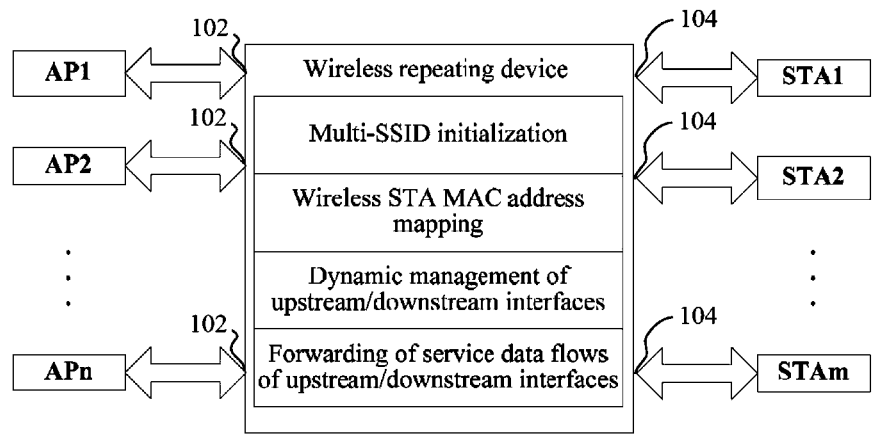
FIG. 1 is a structural diagram of a system in an application scenario according to Embodiment 1 of the present invention.
Figure 2:
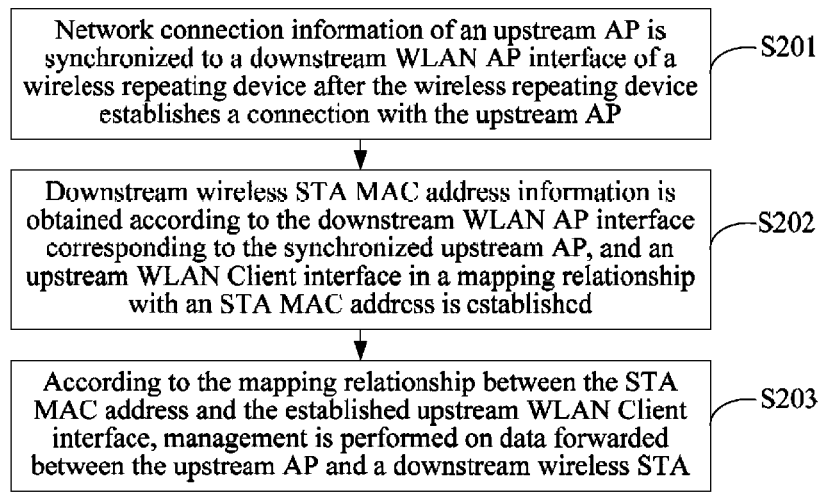
FIG. 2 is a flowchart of implementing a repeating method of a wireless repeating device according to Embodiment 1 of the present invention.

A structural diagram of a system in an application scenario of the present invention is as shown in FIG. 1. The system includes multiple upstream APs: AP1, AP2, AP3, . . . , APn, multiple downstream wireless stations: STA1, STA2, STA3, . . . , STAm, where both m and n are nonzero positive integers, and a wireless repeating device. The wireless repeating device may include multiple virtual upstream WLAN Client interfaces 102 and multiple virtual downstream WLAN AP interfaces 104, where the wireless repeating device accesses an upstream AP through an upstream WLAN Client interface 102, a downstream STA establishes a connection with a downstream WLAN AP interface 104 of the wireless repeating device, and the wireless repeating device may implement transparent transmission of an attached STA MAC address and forwarding of a management flow and data flow between multiple virtual upstream and downstream interfaces. A working process of the wireless repeating device specifically includes: initialization of multiple SSIDs, wireless STA MAC address mapping, dynamic management of upstream and downstream interfaces, and forwarding of service data flows of upstream and downstream interfaces. A repeating method of the wireless repeating device is described below through an embodiment, where FIG. 2 is a flowchart of implementing a repeating method of a wireless repeating device according to Embodiment 1 of the present invention, and details are described below.

In step S201, network connection information of an upstream AP is synchronized to a downstream WLAN AP interface of the wireless repeating device after the wireless repeating device establishes a connection with the upstream AP.

In this embodiment, when the number of the upstream APs is one, network connection information of the one upstream AP is synchronized to one downstream WLAN AP interface; when the number of the upstream APs is multiple, network connection information of the multiple upstream APs is synchronized to multiple downstream WLAN AP interfaces, where the upstream APs may be multiple APs in different encryption/authentication modes.

In step S202, downstream wireless STA MAC address information is obtained according to the downstream WLAN AP interface corresponding to the synchronized upstream AP, and an upstream WLAN Client interface in a mapping relationship with an STA MAC address is established.

In this embodiment, the mapping relationship between the STA MAC address and the established upstream WLAN Client interface is a reversible single mapping relationship.

In step S203, management is performed, according to the mapping relationship between the STA MAC address and the established upstream WLAN Client interface, on data forwarded between the upstream AP and a downstream wireless STA, where the data is management action data or service data.

In this embodiment, management actions may be associate (Associate), authenticate (Authenticate), disassociate notify (Disassociate notify), deauthenticate notify (Deauthenticate notify), and reassociate (Reassociate).

In this embodiment, the network connection information of the upstream AP is synchronized to the downstream WLAN AP interface, and the upstream WLAN Client interface in the mapping relationship with the STA MAC address is established; based on the foregoing mapping relationship, for actions of operations performed on a data flow or management flow between the upstream AP and the upstream WLAN Client interface, all the actions may be performed by a downstream WLAN AP interface proxy corresponding to the upstream AP interface, and a certain downstream STA, where the downstream STA may be searched for through the mapping relationship between the STA MAC address and the upstream WLAN Client interface, thereby achieving effective transparent transmission of the attached wireless STA MAC address. Therefore, for corresponding actions of authentication and accounting performed by an upstream AAA authentication party or accounting party on the upstream WLAN Client interface through the upstream AP, all the corresponding actions may be performed by a downstream WLAN AP interface proxy corresponding to the upstream AP, and a certain downstream STA. In this manner, it is achieved that the AAA authentication or accounting party may perform accounting on an STA MAC address of each attached STA separately, thereby meeting a requirement of unified authentication/accounting based on a MAC address. Meanwhile, when a WLAN Repeater is interconnected with some upstream gateway devices with enabled DHCP spoofing/flooding functions, a DHCP Server of an upstream device may still implement normal functions such as IP address assignment or lease renewing, and an STA at a WLAN Client side may obtain a corresponding IP address and continue with Internet access.

Embodiment 2

Figure 3:
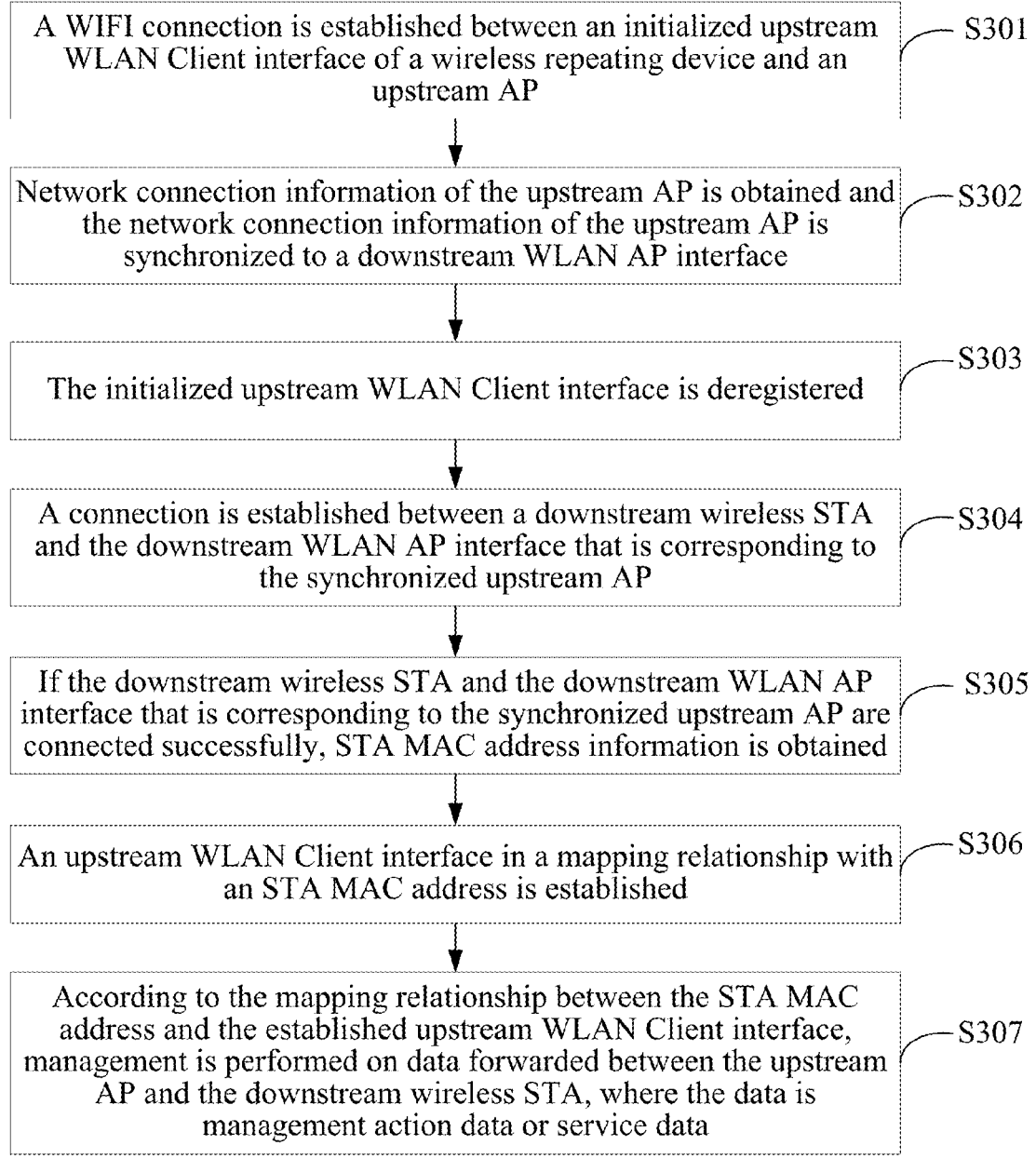
FIG. 3 is a flowchart of implementing a repeating method of a wireless repeating device according to Embodiment 2 of the present invention.

FIG. 3 is a flowchart of implementing a repeating method of a wireless repeating device according to Embodiment 2 of the present invention. Details are described below:

In step S301, a WIFI connection is established between an initialized upstream WLAN Client interface of a wireless repeating device and an upstream AP.

In this embodiment, initializing a WLAN Client interface of an upstream wireless repeating device may be initialing one upstream WLAN Client interface, and may also be initializing multiple upstream WLAN Client interfaces, which is not used to limit the present invention here.

In step S302, network connection information of the upstream AP is obtained, and the network connection information of the upstream AP is synchronized to a downstream WLAN AP interface.

In this embodiment, the network connection information may include an encryption mode of a network connection, password information of a network connection, service set identifier (Service Set Identifier, SSID) information, an authentication manner, a physical working channel, and so on.

In step S303, the initialized upstream WLAN Client interface is deregistered.

In this embodiment, when the synchronization is completed, the initialized upstream WLAN Client interface is deregistered, to prevent an interface which is not deregistered from occupying a system resource.

In step S304, a connection is established between a downstream wireless STA and the downstream WLAN AP interface that is corresponding to the synchronized upstream AP.

In this embodiment, a network connection may be established between a downstream wireless STA and a downstream WLAN AP interface, and network connections may also be established between multiple downstream wireless STAs and a same downstream WLAN AP interface.

In step S305, if the downstream wireless STA and the downstream WLAN AP interface that is corresponding to the synchronized upstream AP are connected successfully, STA MAC address information is obtained.

In this embodiment, if the downstream wireless STA and the downstream WLAN AP interface that is corresponding to the synchronized upstream AP are connected successfully, STA MAC address information corresponding to the STA is obtained; if the downstream wireless STA and the downstream WLAN AP interface that is corresponding to the synchronized upstream AP are not connected successfully, the network connection continues to be performed.

In step S306, an upstream WLAN Client interface in a mapping relationship with an STA MAC address is established.

In this embodiment, by establishing the upstream WLAN Client interface which is in the mapping relationship with the STA MAC address, automatic mapping from the STA MAC address to the upstream WLAN Client interface is completed.

In step S307, management is performed, according to the mapping relationship between the STA MAC address and the established upstream WLAN Client interface, on data forwarded between the upstream AP and the downstream wireless STA, where the data is management action data or service data.

In this embodiment, management actions may be associate (Associate), authenticate (Authenticate), disassociate notify (Disassociate notify), deauthenticate notify (Deauthenticate notify), and reassociate (Reassociate).

Optionally, when the data is management action data and an action initiator is the upstream AP, step S307 specifically is:

1. Through the upstream WLAN Client interface, management action data sent by the upstream AP is received, and a management action is completed; and 2. According to the mapping relationship between the STA MAC address and the established upstream WLAN Client interface, a downstream wireless STA corresponding to the upstream WLAN Client interface is searched for, and the management action is completed between a downstream WLAN AP interface corresponding to the upstream AP interface, and the downstream wireless STA.

When the management action is deauthenticate notify, after step 2, the following step is further included:

deregistering a downstream WLAN AP interface corresponding to the STA, and the upstream WLAN Client interface.

Optionally, when the data is management action data and an action initiator is the downstream wireless STA, step S307 specifically is:

1. Through the downstream WLAN AP interface, management action data sent by the downstream wireless STA is received, and a management action is completed; and 2. According to the mapping relationship between the STA MAC address and the established upstream WLAN Client interface, an upstream WLAN Client interface corresponding to the downstream wireless STA is searched for, and the management action is completed between the upstream WLAN Client interface found by searching and an upstream AP corresponding to the downstream WLAN AP interface.

When the management action is Deauthenticate notify, after step 2, the following step is further included:

deregistering a downstream WLAN AP interface corresponding to the STA, and the upstream WLAN Client interface.

Figure 4:
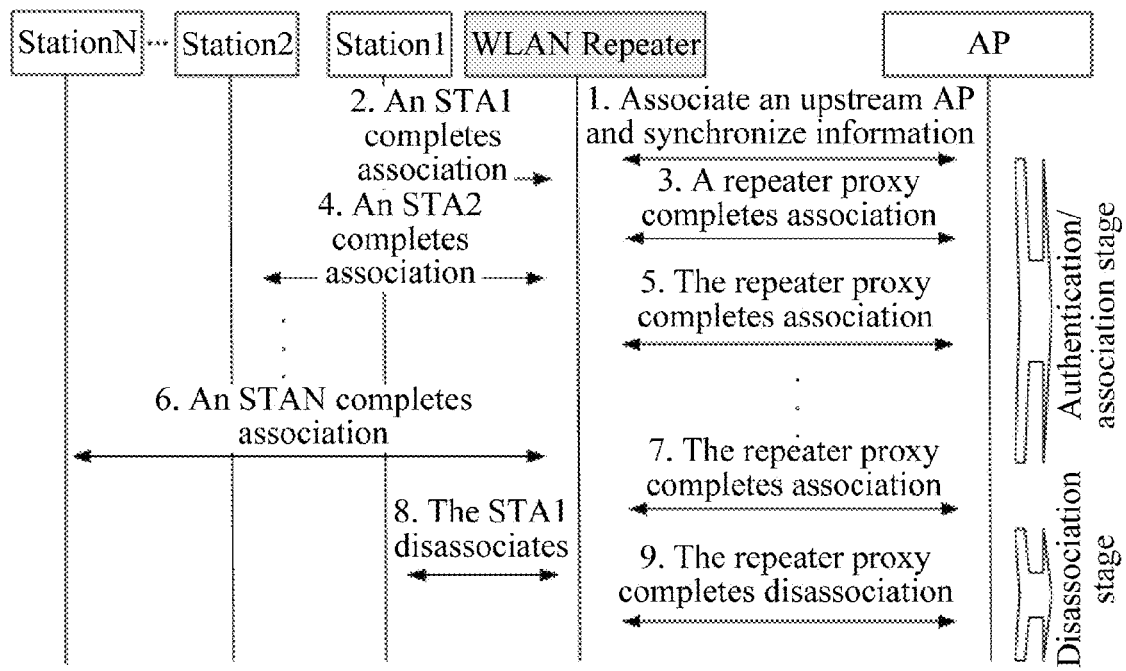
FIG. 4 is an implementation flowchart of an implementation example of the repeating method of the wireless repeating device according to Embodiment 2 of the present invention.

For ease of understanding, an implementation process in which a WLAN Repeater performs association is illustrated below by using a specific implementation example, but the present invention is not limited to the implementation process of the implementation example. It is assumed that the upstream AP is a single AP and downstream stations are STA1, STA2, . . . , STAN. A working flow of the WLAN Repeater is as shown in FIG. 4:

1. Associate an upstream AP and synchronize information;
2. An STA1 completes association;
3. A Repeater proxy completes association;
4. An STA2 completes association;
5. The Repeater proxy completes association;
. . .
6. An STAN completes association;
7. The Repeater proxy completes association;
8. The STA1 disassociates;
9. The Repeater proxy completes disassociation;
. . .

In this implementation example, the upstream AP attempts to be associated with the STAT. In this case, the upstream AP first sends an association management action to the WLAN Repeater, the WLAN Repeater synchronizes information of the downstream WLAN AP interface corresponding to the upstream AP, and by using the synchronization information, a WLAN Repeater proxy is associated with the STA1, so that the STA1 completes the association. Similarly, the upstream AP may be associated with other stations: STA2, STA3, . . . , STAN. Contrariwise, when a certain station needs disassociation, the WLAN Repeater proxy may complete the disassociation.

Optionally, when the data is service data and the service data is from an upstream AP to a downstream wireless STA, step S307 specifically is:

1) Through the upstream WLAN Client interface, service data sent by the upstream AP is received;

2) According to the mapping relationship between the STA MAC address and the established upstream WLAN Client interface, a downstream wireless STA corresponding to the upstream WLAN Client interface is searched for, and a destination address corresponding to the service data is mapped into an STA MAC address corresponding to the downstream wireless STA; and 3) Through the downstream WLAN AP interface, the mapped service data is sent to the downstream wireless STA.

Optionally, when the data is service data and the service data is from a downstream wireless STA to the upstream AP, step S307 specifically is:

1) Through the downstream WLAN AP interface, service data sent by the downstream wireless STA is received;

2) According to the mapping relationship between the STA MAC address and the established upstream WLAN Client interface, an upstream WLAN Client interface corresponding to the downstream wireless STA is searched for, and a source address of the service data is mapped into a WLAN Client address corresponding to the upstream WLAN Client interface; and 3) Through the upstream WLAN Client interface found by searching, the mapped service data is sent to an upstream AP corresponding to the downstream WLAN AP interface.

Embodiment 3

Figure 5:
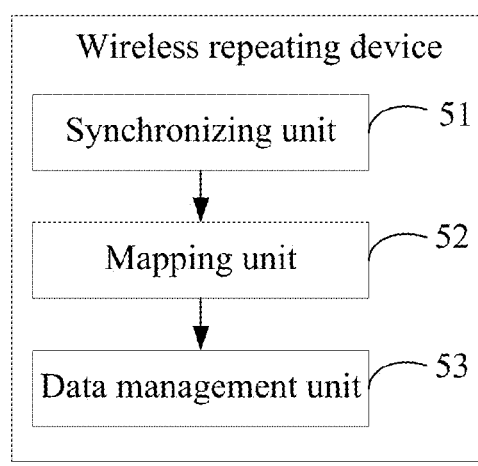
FIG. 5 is a structural diagram of a wireless repeating device according to Embodiment 3 of the present invention.

FIG. 5 is a structural diagram of a wireless repeating device according to Embodiment 3 of the present invention; and for ease of illustration, only parts related to the embodiment of the present invention are shown.

The wireless repeating device includes a synchronizing unit 51, a mapping unit 52, and a data management unit 53.

The synchronizing unit 51 is configured to synchronize network connection information of an upstream AP to a downstream WLAN AP interface of the wireless repeating device after the connection between a wireless repeating device and the upstream AP is established.

The mapping unit 52 is configured to obtain, according to the downstream WLAN AP interface corresponding to the synchronized upstream AP, downstream wireless STA MAC address information, and establish an upstream WLAN Client interface which is in a mapping relationship with an STA MAC address.

The data management unit 53 is configured to perform, according to the mapping relationship between the STA MAC address and the established upstream WLAN Client interface, management on data forwarded between the upstream AP and a downstream wireless STA, where the data is management action data or service data.

The wireless repeating device according to this embodiment of the prevent invention may be used in Embodiment 1 of the foregoing corresponding method. Reference may be made to the foregoing description of Embodiment 1 for details, which are not repeatedly described here.

In this embodiment, the wireless repeating device establishes the upstream WLAN Client interface which is in the mapping relationship with the STA MAC address by synchronizing the network connection information of the upstream AP to the downstream WLAN AP interface; based on the foregoing mapping relationship, for actions of operations performed on a data flow or management flow between the upstream AP and the upstream WLAN Client interface, all the actions may be performed by a downstream WLAN AP interface proxy corresponding to the upstream AP interface, and a certain downstream STA, where the downstream STA may be searched for through the mapping relationship between the STA MAC address and the upstream WLAN Client interface, thereby achieving effective transparent transmission of an attached wireless STA MAC address. Therefore, for corresponding actions of authentication and accounting performed by an upstream AAA authentication party or accounting party on the upstream WLAN Client interface through the upstream AP, all the corresponding actions may be performed by a downstream WLAN AP interface proxy corresponding to the upstream AP, and a certain downstream STA. In this manner, it is achieved that the authentication or accounting party may perform accounting on an STA MAC address of each attached STA separately, thereby meeting a requirement of unified authentication/accounting based on a MAC address. Meanwhile, when a WLAN Repeater is interconnected with some upstream gateway devices with enabled DHCP spoofing/flooding functions, a DHCP Server of an upstream device may still implement normal functions such as IP address assignment or lease renewing, and an STA at a WLAN Client side may obtain a corresponding IP address and continue with Internet access.

Embodiment 4

Figure 6:
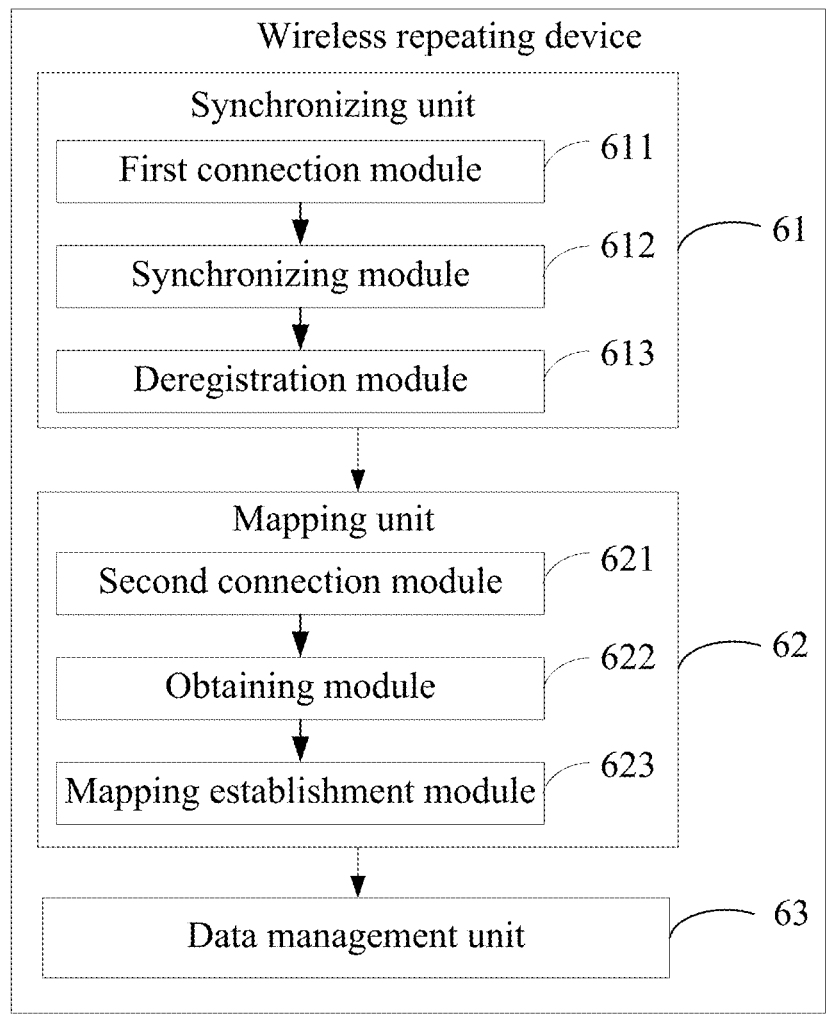
FIG. 6 is a structural diagram of a wireless repeating device according to Embodiment 4 of the present invention.

FIG. 6 is a structural diagram of a wireless repeating device according to Embodiment 4 of the present invention; and for ease of illustration, only parts related to the embodiment of the present invention are shown.

The wireless repeating device includes a synchronizing unit 61, a mapping unit 62, and a data management unit 63.

A difference between this embodiment and Embodiment 3 is that the synchronizing unit 61 specifically includes a first connection module 611, a synchronizing module 612, and a deregistration module 613.

The first connection module 611 is configured to establish a WIFI connection between an initialized upstream WLAN Client interface of the wireless repeating device and an upstream AP.

The synchronizing module 612 is configured to obtain network connection information of the upstream AP, and synchronize the network connection information of the upstream AP to a downstream WLAN AP interface.

The deregistration module 613 is configured to deregister the initialized upstream WLAN Client interface.

Furthermore, the mapping unit 62 specifically includes a second connection module 621, an obtaining module 622, and a mapping establishment module 623.

The second connection module 621 is configured to establish a connection between a downstream wireless STA and the downstream WLAN AP interface that is corresponding to the synchronized upstream AP.

The obtaining module 622 is configured to, if the downstream wireless STA and the downstream WLAN AP interface that is corresponding to the synchronized upstream AP are connected successfully, obtain STA MAC address information.

The mapping establishment module 623 is configured to establish a WLAN Client interface which is in a reversible single mapping relationship with an STA MAC address.

In this embodiment, the mapping relationship between the STA MAC address and the established upstream WLAN Client interface is the reversible single mapping relationship.

Furthermore, when the data is management action data and an action initiator is the upstream AP, the data management unit 63 is specifically configured to:

through the upstream WLAN Client interface, receive management action data sent by the upstream AP, and complete a management action; and according to the mapping relationship between the STA MAC address and the established upstream WLAN Client interface, search for a downstream wireless STA corresponding to the upstream WLAN Client interface, and complete a management action between a downstream WLAN AP interface corresponding to an upstream AP interface, and the downstream wireless STA.

Furthermore, when the data is management action data and an action initiator is the downstream wireless STA, the data management unit 63 is specifically configured to:

through the downstream WLAN AP interface, receive management action data sent by the downstream wireless STA, and complete a management action; and according to the mapping relationship between the STA MAC address and the established upstream WLAN Client interface, search for an upstream WLAN Client interface corresponding to the downstream wireless STA, and complete a management action between the upstream WLAN Client interface found by searching and an upstream AP corresponding to the downstream WLAN AP interface.

In this embodiment, management actions may specifically be associate Associate, authenticate Authenticate, disassociate notify Disassociate notify, deauthenticate notify Deauthenticate notify, and reassociate Reassociate.

When the management action is Deauthenticate notify, the data management unit 63 is further configured to deregister a downstream WLAN AP interface corresponding to the STA, and the upstream WLAN Client interface.

Furthermore, when the data is service data and the service data is from an upstream AP to a downstream wireless STA, the data management unit 63 is specifically configured to:

through the upstream WLAN Client interface, receive service data sent by the upstream AP;

according to the mapping relationship between the STA MAC address and the established upstream WLAN Client interface, search for a downstream wireless STA corresponding to the upstream WLAN Client interface, map a destination address corresponding to the service data into an STA MAC address corresponding to the downstream wireless STA; and through the downstream WLAN AP interface, send the mapped service data to the downstream wireless STA.

Furthermore, when the data is service data and the service data is from a downstream wireless STA to an upstream AP, the data management unit 63 is specifically configured to:

through the downstream WLAN AP interface, receive service data sent by the downstream wireless STA;

according to the mapping relationship between the STA MAC address and the established upstream WLAN Client interface, search for an upstream WLAN Client interface corresponding to the downstream wireless STA, and map a source address of the service data into a WLAN Client address corresponding to the upstream WLAN Client interface; and through the upstream WLAN Client interface found by searching, send the mapped service data to an upstream AP corresponding to the downstream WLAN AP interface.

The wireless repeating device according to this embodiment of the prevent invention may be used in Embodiment 2 of the foregoing corresponding method. Reference may be made to the description of Embodiment 2 for details, which are not repeatedly described here.

It should be noted that in the foregoing embodiments of apparatus and system, the included units are classified according to function logic, but the present invention is not limited to the foregoing classification, as long as corresponding functions can be realized. In addition, specific names of the functional units are also only for ease of differentiation, and are not intended to limit the protection scope of the present invention.

Moreover, persons of ordinary skill in the art may understand that all or part of the steps in the method of the foregoing embodiments of the present invention may be implemented by a program instructing relevant hardware. The program may be stored in a computer readable storage medium, where the storage medium may be a ROM/RAM, a magnetic disk, or an optical disk, and so on.

The foregoing is merely exemplary embodiments of the present invention, and is not intended to limit the present invention. Any modification, equivalent replacement, and improvement made without departing from the spirit and principle of the present invention shall fall within the protection scope of the present invention.

What is claimed is:

1. A repeating method of a wireless repeating device, the method comprising:

forming an initial upstream connection between an initial upstream WLAN Client interface of the wireless repeating device and an access point (AP) disposed upstream of the wireless repeating device;

obtaining network connection information of the AP used to form the initial upstream connection;

synchronizing the network connection information to a downstream WLAN AP interface of the wireless repeating device;

forming a first downstream connection between the downstream WLAN AP interface and a first wireless station, and a second downstream connection between the downstream WLAN AP interface and a second wireless station, using the network connection information;

establishing a first upstream WLAN Client interface of the wireless repeating device, and forming a first upstream connection between the first upstream WLAN Client interface and the AP using the network connection information;

establishing a second upstream WLAN Client interface of the wireless repeating device, and forming a second upstream connection between the second upstream WLAN Client interface and the AP using the network connection information;

saving a mapping relationship between the first upstream WLAN Client interface and a MAC address of the first wireless station, and a mapping relationship between the second upstream WLAN Client interface and a MAC address of the second wireless station;

receiving, via the first upstream WLAN Client interface, first service data sent by the AP, the first service data containing a destination MAC address set to a MAC address of the first upstream WLAN Client interface;

identifying, according to the saved mapping relationship between the first upstream WLAN Client interface and the MAC address of the first wireless station, the MAC address of the first wireless station as corresponding to the first upstream WLAN Client interface, and replacing the destination MAC address with the MAC address of the first wireless station;

sending the first service data with the replaced destination MAC address to the first wireless station via the downstream WLAN AP interface;

receiving second service data sent by the second wireless station, the second service data containing the MAC address of the second wireless station as a source address;

identifying according to the saved mapping relationship between the second upstream WLAN Client interface and the MAC address of the second wireless station, the second upstream WLAN Client interface as corresponding to the MAC address of the second wireless station, and replacing the source address of the second service data with a MAC address of the second upstream WLAN Client interface;

sending the second service data with the replaced source address to the AP via the second upstream WLAN Client interface;

receiving third service data sent by the first wireless station, the third service data containing the MAC address of the first wireless station as a source address;

identifying, according to the saved mapping relationship between the first upstream WLAN Client interface and the MAC address of the first wireless station, the first upstream WLAN Client interface as corresponding to the MAC address of the first wireless station, and replacing the source address of the third service data with the MAC address of the first upstream WLAN Client interface; and sending the third service data with the replaced source address to the AP via the first upstream WLAN Client interface, wherein the MAC address of the first upstream WLAN Client interface and the MAC address of the second upstream WLAN Client interface are different.

2. The method according to claim 1, wherein the method further comprises:

deregistering the initial upstream WLAN Client interface.

3. The method according to claim 1, wherein the method further comprises:

receiving management action data sent by the AP via the first upstream WLAN Client interface, and completing a management action; and according to the saved mapping relationships identifying a first wireless station corresponding to the first upstream WLAN Client interface, and completing the management action between the downstream WLAN AP interface-and the first wireless station.

4. The method according to claim 3, wherein management-action comprises one of: Disassociate Notify, Deauthenticate Notify, and Reassociate.

5. The method according to claim 1, wherein the method further comprises:

receiving management action data sent by the second wireless station via the downstream WLAN AP interface, and completing a management action; and according to the saved mapping relationships identifying a second upstream WLAN Client interface corresponding to the second wireless station, and completing the management action between the second upstream WLAN Client interface and the AP.

6. The method according to claim 5, wherein when the management action is Deauthenticate Notify, the method further comprises deregistering the second upstream WLAN Client interface.

7. The method according to claim 1, wherein the network connection information includes an encryption mode of a network connection, password information of a network connection, service set identifier (SSID) information, an authentication manner, a physical working channel.

8. A system of wireless networking devices, comprising:

an access point (AP); and a wireless repeating device configured to perform operations of:

forming an initial upstream connection between an initial upstream WLAN Client interface of the wireless repeating device and an access point (AP) disposed upstream of the wireless repeating device;

obtaining network connection information of the AP used to form the initial upstream connection;

synchronizing the network connection information to a downstream WLAN AP interface of the wireless repeating device;

forming a first downstream connection between the downstream WLAN AP interface and a first wireless station, and a second downstream connection between the downstream WLAN AP interface and a second wireless station, using the network connection information;

establishing a first upstream WLAN Client interface of the wireless repeating device, and forming a first upstream connection between the first upstream WLAN Client interface and the AP using the network connection information;

establishing a second upstream WLAN Client interface of the wireless repeating device, and forming a second upstream connection between the second upstream WLAN Client interface and the AP using the network connection information;

saving a mapping relationship between the first upstream WLAN Client interface and a MAC address of the first wireless station, and a mapping relationship between the second upstream WLAN Client interface and a MAC address of the second wireless station;

receiving, via the first upstream WLAN Client interface, first service data sent by the AP, the first service data containing a destination MAC address set to a MAC address of the first upstream WLAN Client interface;

identifying, according to the saved mapping relationship between the first upstream WLAN Client interface and the MAC address of the first wireless station, the MAC address of the first wireless station as corresponding to the first upstream WLAN Client interface, and replacing the destination MAC address with the MAC address of the first wireless station;

sending the first service data with the replaced destination MAC address to the first wireless station via the downstream WLAN AP interface;

receiving second service data sent by the second wireless station, the second service data containing the MAC address of the second wireless station as a source address;

identifying, according to the saved mapping relationship between the second upstream WLAN Client interface and the MAC address of the second wireless station, the second upstream WLAN Client interface as corresponding to the MAC address of the second wireless station, and replacing the source address of the second service data with a MAC address of the second upstream WLAN Client interface;

sending the second service data with the replaced source address to the AP via the second upstream WLAN Client interface;

receiving third service data sent by the first wireless station, the third service data containing the MAC address of the first wireless station as a source address;

identifying, according to the saved mapping relationship between the first upstream WLAN Client interface and the MAC address of the first wireless station, the first upstream WLAN Client interface as corresponding to the MAC address of the first wireless station, and replacing the source address of the third service data with the MAC address of the first upstream WLAN Client interface; and sending the third service data with the replaced source address to the AP via the first upstream WLAN Client interface, wherein the MAC address of the first upstream WLAN Client interface and the MAC address of the second upstream WLAN Client interface are different.

9. The system according to claim 8, wherein the wireless repeating device is further configured to perform an operation of:

deregistering the initial upstream WLAN Client interface.

10. The system according to claim 8, wherein the wireless repeating device is further configured to perform operations of:

receiving management action data sent by the AP via the first upstream WLAN Client interface, and complete a management action; and according to the saved mapping relationships identifying a first wireless station corresponding to the first upstream WLAN Client interface, and completing the management action between the downstream WLAN AP interface and the first wireless station.

11. The system according to claim 10, wherein management action comprises one of: Disassociate Notify, Deauthenticate Notify, and Reassociate.

12. The system according to claim 8, wherein the wireless repeating device is further configured to perform operations of:

receiving management action data sent by the second wireless station via the downstream WLAN AP interface, and completing a management action; and according to the saved mapping relationships-identifying a second upstream WLAN Client interface corresponding to the second wireless station, and completing the management action between the second upstream WLAN Client interface and the AP.

13. The system according to claim 12, wherein when the management action is Deauthenticate Notify, the wireless repeating device is further configured to deregister the second upstream WLAN Client interface.

14. The system according to claim 8, wherein the network connection information includes an encryption mode of a network connection, password information of a network connection, service set identifier (SSID) information, an authentication manner, a physical working channel.

* * * * *